United States Patent
Kim et al.

(10) Patent No.: US 11,109,193 B2
(45) Date of Patent: Aug. 31, 2021

(54) METHOD AND DEVICE FOR PERFORMING POSITIONING USING DRONE

(71) Applicant: LG ELECTRONICS INC., Seoul (KR)

(72) Inventors: Myeongjin Kim, Seoul (KR); Sangrim Lee, Seoul (KR); Hojae Lee, Seoul (KR)

(73) Assignee: LG Electronics Inc., Seoul (KR)

( * ) Notice: Subject to any disclaimer, the term of this patent is extended or adjusted under 35 U.S.C. 154(b) by 0 days.

(21) Appl. No.: 16/959,606

(22) PCT Filed: Jan. 12, 2018

(86) PCT No.: PCT/KR2018/000617
§ 371 (c)(1),
(2) Date: Jul. 1, 2020

(87) PCT Pub. No.: WO2019/139191
PCT Pub. Date: Jul. 18, 2019

(65) Prior Publication Data
US 2020/0389766 A1    Dec. 10, 2020

(51) Int. Cl.
*H04W 4/029* (2018.01)
*G01S 5/06* (2006.01)
*H04L 5/00* (2006.01)

(52) U.S. Cl.
CPC .............. *H04W 4/029* (2018.02); *G01S 5/06* (2013.01); *H04L 5/0048* (2013.01)

(58) Field of Classification Search
CPC ........... H04W 64/00; H04W 4/02; G01S 5/06; H04L 5/0048
See application file for complete search history.

(56) References Cited

U.S. PATENT DOCUMENTS

2013/0336176 A1    12/2013 Rubin et al.
2015/0140954 A1    5/2015 Maier et al.
(Continued)

FOREIGN PATENT DOCUMENTS

KR    101794457 B1    11/2017
WO    2017091011 A1    6/2017
(Continued)

OTHER PUBLICATIONS

H. Jin, et al., "A study on the transport to the nearest base station through the drone equipped with the LTE modem and the USIM", Proceeding of Symposium of Korea Institute of Communications and Information Sciences, Jun. 2016, pp. 1521-1522.

*Primary Examiner* — Charles N Appiah
*Assistant Examiner* — Frank E Donado
(74) *Attorney, Agent, or Firm* — Dentons US LLP

(57) ABSTRACT

An embodiment of the present specification may provide a method for performing positioning using a drone by a terminal in a wireless communication system. The method for performing positioning using a drone by a terminal may comprise the steps of: transmitting information on a drone-positioning reference signal (D-PRS) configuration to a base station; receiving the D-PRS configuration information from the base station; receiving a positioning reference signal (PRS) from the base station and receiving the D-PRS from the drone; obtaining position-related information of the terminal on the basis of the PRS and the D-PRS; and transmitting the position-related information to the base station. The terminal is capable of communicating with at least one of another terminal, a terminal related to an autonomous driving vehicle, a base station or a network.

16 Claims, 14 Drawing Sheets

(56) References Cited

U.S. PATENT DOCUMENTS

| | | |
|---|---|---|
| 2016/0205499 A1 | 7/2016 | Davydov et al. |
| 2017/0325221 A1 | 11/2017 | Jalali |
| 2018/0279143 A1* | 9/2018 | Bhattad ................ H04W 48/12 |
| 2019/0180633 A1* | 6/2019 | Yoshizawa ........... G08G 5/0082 |
| 2019/0212724 A1* | 7/2019 | Phuyal ................. G05D 1/0022 |
| 2020/0097028 A1* | 3/2020 | Axmon ................ H04W 4/023 |
| 2020/0187031 A1* | 6/2020 | Kazmi ................ H04W 52/245 |
| 2020/0252838 A1* | 8/2020 | Akdeniz ................ H04W 4/70 |
| 2020/0301450 A1* | 9/2020 | Li ....................... G05B 19/4185 |

FOREIGN PATENT DOCUMENTS

| | | |
|---|---|---|
| WO | 2017184865 A1 | 10/2017 |
| WO | 2017189131 A1 | 11/2017 |

\* cited by examiner

FIG. 7
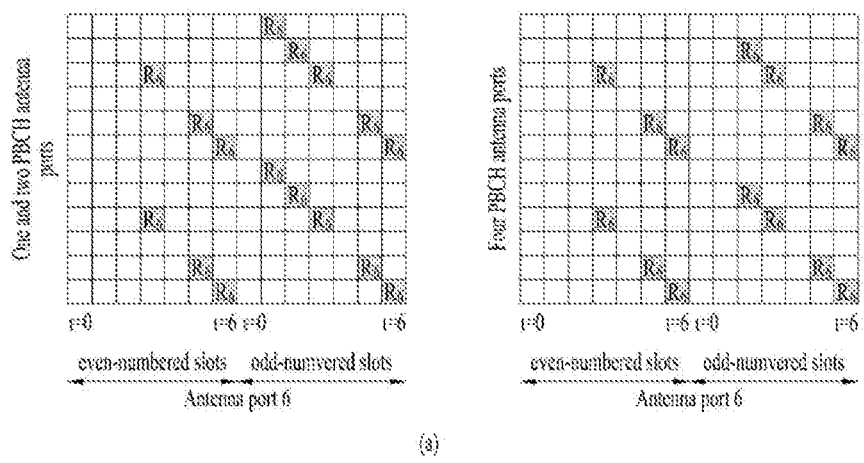
(a)
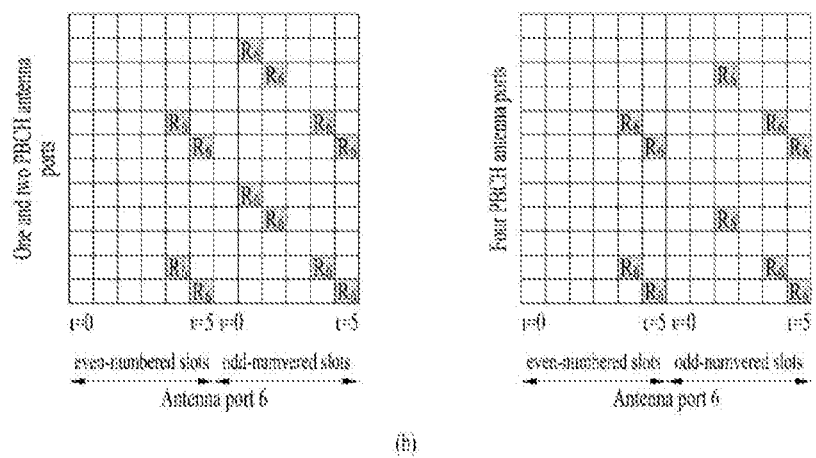
(b)

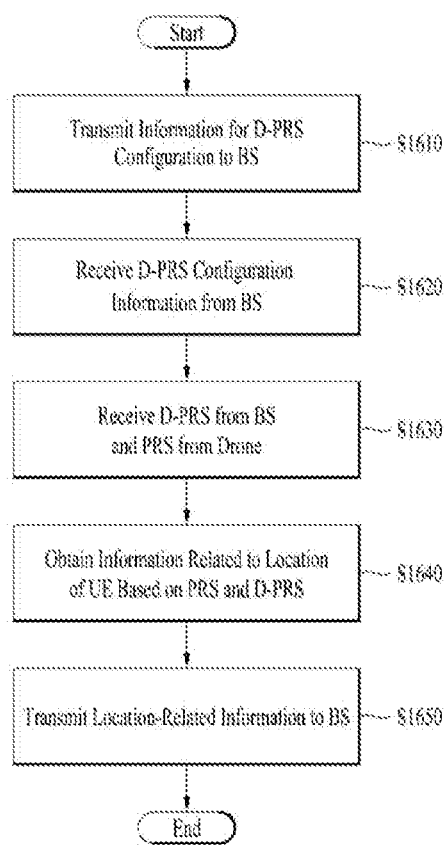

METHOD AND DEVICE FOR PERFORMING POSITIONING USING DRONE

TECHNICAL FIELD

The present disclosure relates to a wireless communication system, and more particularly, to a method and apparatus for performing positioning by using a drone.

BACKGROUND ART

Wireless access systems have been widely deployed to provide various types of communication services such as voice or data. In general, a wireless access system is a multiple access system that may support communication of multiple users by sharing available system resources (e.g., a bandwidth, transmission power, etc.). For example, multiple access systems include a code division multiple access (CDMA) system, a frequency division multiple access (FDMA) system, a time division multiple access (TDMA) system, an orthogonal frequency division multiple access (OFDMA) system, a single carrier frequency division multiple access (SC-FDMA) system, and a multi carrier frequency division multiple access (MC-FDMA) system.

$3^{rd}$ generation partnership project long term evolution (3GPP LTE)) system is designed with a frame structure having a TTI (transmission time interval) of 1 ms and data requirement latency time for a video application is 10 ms. Yet, with the advent of a new application such as real-time control and tactile internet, 5G technology in the future requires data transmission of lower latency and it is anticipated that 5G data requirement latency time is going to be lowered to 1 ms. The 5G technology requires an eNB to have more UE connectivity and it is anticipated that the connectivity required by the 5G is going to be increased up to maximum 1,000,000/km2.

As more communication devices require greater communication capacity, necessity for mobile broadband communication, which is enhanced compared to a legacy radio access technology (RAT), is emerging. Moreover, discussion on a communication system to be designed in consideration of a service/LTE sensitive to reliability and latency is in progress. Introduction of a next generation radio access technology (RAT) is being discussed in consideration of the enhanced mobile broadband communication (eMBB), the massive MTC (mMTC), URLLC (ultra-reliable and low latency communication), and the like. In the following, for clarity, the technology is referred to as a New RAT.

Along with the recent growth of drones, efficient communication methods for drones and existing communication devices are under discussion. For example, a drone may be a flying object that flies according to a control signal of radio waves, and may be a communication device.

DISCLOSURE

Technical Problem

An aspect of the present disclosure is to provide a method and apparatus for performing positioning by using a drone in a wireless communication system.

Another aspect of the present disclosure is to provide a method and apparatus for performing positioning in consideration of the mobility of a drone.

Another aspect of the present disclosure is to provide a method and apparatus for performing observed time difference of arrival (OTDOA)-based positioning by using a drone.

Technical Solution

According to an embodiment of the present disclosure, a method of performing positioning by using a drone at a user equipment (UE) in a wireless communication system may be provided. The method may include transmitting information for drone positioning reference signal (D-PRS) configuration to a base station (BS), receiving D-PRS configuration information from the BS, receiving a positioning reference signal (PRS) from the BS and receiving a D-PRS from a drone, obtaining location-related information about the UE based on the PRS and D-PRS, and transmitting the location-related information to the BS.

According to an embodiment of the present disclosure, a UE for performing positioning by using a drone in a wireless communication system may be provided. The UE may include a receiver configured to receive a signal, a transmitter configured to transmit a signal, and a processor configured to control the receiver and the transmitter. The processor may be configured to transmit information for D-PRS configuration to a BS, receive D-PRS configuration information from the BS, receive a PRS from the BS, receive a D-PRS from a drone, obtain location-related information about the UE based on the PRS and D-PRS, and transmit the location-related information to the BS.

Further, the following may be applied commonly to the method and apparatus for performing positioning by using a drone at a UE in a wireless communication system.

According to an embodiment of the present disclosure, when the UE receives a request for transmission of the information for D-PRS configuration from the BS, the UE may transmit the information for D-PRS configuration to the BS.

Further, according to an embodiment of the present disclosure, after the BS exchanges information related to the D-PRS with the drone, the BS may transmit the D-PRS configuration information to the UE.

According to an embodiment of the present disclosure, the BS and the drone may synchronize a transmission timing of the PRS with a transmission timing of the D-PRS based on the information related to the D-PRS.

Further, according to an embodiment of the present disclosure, the UE may receive a D-PRS from each of a plurality of drones having different cell identifiers (IDs).

Further, according to an embodiment of the present disclosure, the UE may receive a D-PRS from each of a plurality of drones having the same cell ID.

According to an embodiment of the present disclosure, different subbands may be allocated to the plurality of drones, and the UE may receive the D-PRS from each of the plurality of drones in the allocated subband.

Further, according to an embodiment of the present disclosure, when the drone has moved for a distance equal to or larger than a threshold, the UE may receive the D-PRS configuration information again from the BS.

Advantageous Effects

The present disclosure may provide a method of performing positioning by using a drone in a wireless communication system.

The present disclosure may provide a method of performing positioning in consideration of the mobility of a drone.

The present disclosure may provide a method of performing observed time difference of arrival (OTDOA)-based positioning by using a drone.

It will be appreciated by persons skilled in the art that the effects that can be achieved with the present disclosure are not limited to what has been particularly described hereinabove and other advantages of the present disclosure will be more clearly understood from the following detailed description taken in conjunction with the accompanying drawings.

BRIEF DESCRIPTION OF THE DRAWINGS

The accompanying drawings, which are included to provide a further understanding of the disclosure and are incorporated in and constitute a part of this application, illustrate embodiments of the disclosure and together with the description serve to explain the principle of the disclosure.

FIG. 7 is a diagram illustrating a method of mapping a PRS to resource elements (REs).

FIG. 16 is a flowchart illustrating a method of positioning a UE, performed by a drone.

BEST MODE

Figure 1:
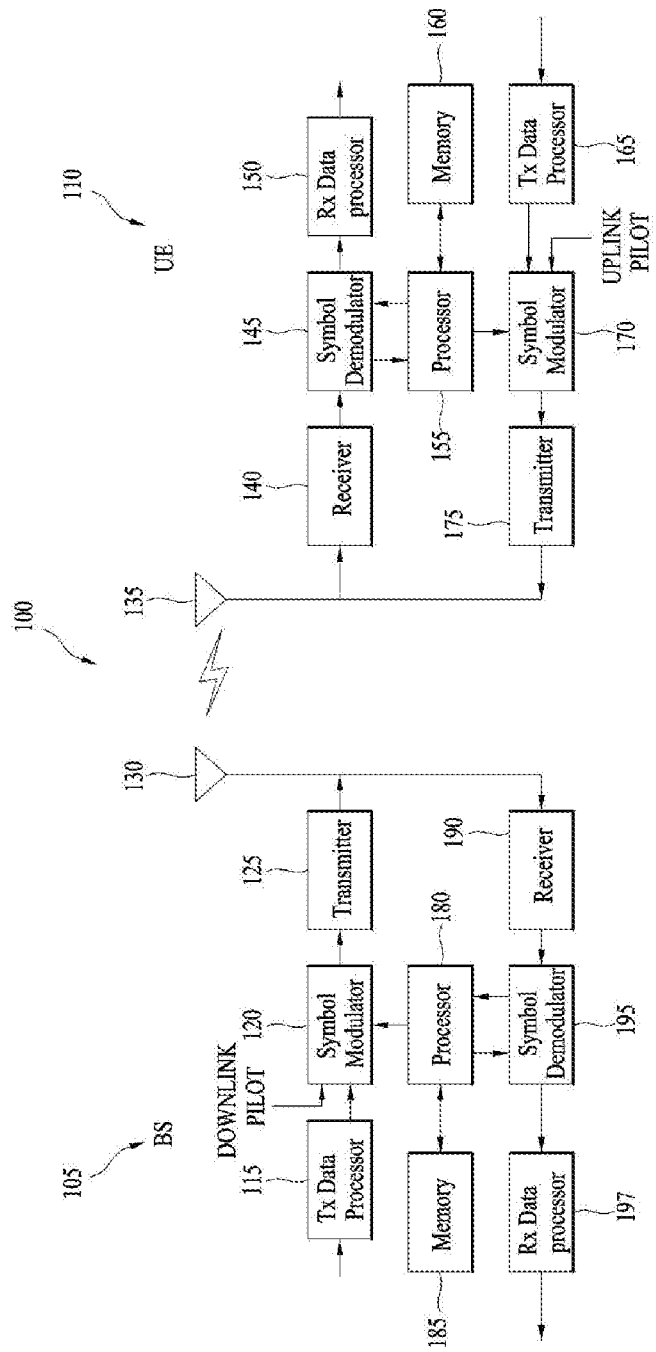
FIG. 1 is a block diagram illustrating a base station (BS) 105 and a user equipment (UE) (or drone) 110 in a wireless communication system 100.

Reference will now be made in detail to the preferred embodiments of the present disclosure, examples of which are illustrated in the accompanying drawings. In the following detailed description of the disclosure includes details to help the full understanding of the present disclosure. Yet, it is apparent to those skilled in the art that the present disclosure can be implemented without these details. For instance, although the following descriptions are made in detail on the assumption that a mobile communication system includes a 3rd generation partnership project (3GPP) long term evolution (LTE) system, the following descriptions are applicable to other random mobile communication systems in a manner of excluding unique features of the 3GPP LTE.

Occasionally, to prevent the present disclosure from getting vaguer, structures and/or devices known to the public are skipped or can be represented as block diagrams centering on the core functions of the structures and/or devices. Wherever possible, the same reference numbers will be used throughout the drawings to refer to the same or like parts.

Besides, in the following description, assume that a terminal is a common name of such a mobile or fixed user stage device as a user equipment (UE), a mobile station (MS), an advanced mobile station (AMS) and the like. And, assume that a base station (BS) is a common name of such a random node of a network stage communicating with a terminal as a node B (NB), an eNode B (eNB), an access point (AP) and the like. Although the present specification is described based on 3GPP LTE system or 3GPP LTE-A system, contents of the present disclosure may be applicable to various kinds of other communication systems.

In a mobile communication system, a UE is able to receive information in downlink (DL) and is able to transmit information in uplink (UL) as well. Information transmitted or received by the UE may include various kinds of data and control information. In accordance with types and usages of the information transmitted or received by the UE, various physical channels may exist.

The following descriptions are usable for various wireless access systems including code division multiple access (CDMA), frequency division multiple access (FDMA), time division multiple access (TDMA), orthogonal frequency division multiple access (OFDMA), single carrier frequency division multiple access (SC-FDMA) and the like. CDMA can be implemented by such a radio technology as universal terrestrial radio access (UTRA), CDMA 2000 and the like. TDMA can be implemented with such a radio technology as global system for mobile communications/general packet radio service/enhanced data rates for GSM evolution (GSM/GPRS/EDGE). OFDMA can be implemented with such a radio technology as IEEE 802.11 (Wi-Fi), IEEE 802.16 (WiMAX), IEEE 802.20, evolved UTRA (E-UTRA), etc. UTRA is a part of universal mobile telecommunications system (UMTS).

3GPP LTE is a part of evolved UMTS (E-UMTS) that uses E-UTRA. The 3GPP LTE employs OFDMA in DL and SC-FDMA in UL. And, LTE-A is an evolved version of 3GPP LTE.

Moreover, in the following description, specific terminologies are provided to help the understanding of the present disclosure. And, the use of the specific terminology can be modified into another form within the scope of the technical idea of the present disclosure.

Regarding wireless transmission between a BS and a UE, transmission from the BS to the UE and transmission from the UE to the BS are referred to as DL transmission and UL transmission, respectively. A scheme of distinguishing between radio resources for DL and UL transmission is defined as duplex. When frequency bands are divided into DL transmission bands and UL transmission bands to perform bidirectional transmission and reception, it is referred to as frequency division duplex (FDD). In addition, when time resources are divided into DL transmission resources and UL transmission resources to perform the bidirectional transmission and reception, it is referred to as time division duplex (TDD). When time and frequency resources are shared to perform the bidirectional transmission and reception, it is referred to as full duplex. It is apparent that the method proposed in the present disclosure operates not only in the FDD but also in the TDD or full duplex.

FIG. 1 is a block diagram for configurations of a BS 105 and a UE 110 in a wireless communication system 100.

Although one BS 105 and one UE 110 (D2D UE included) are shown in the drawing to schematically represent the wireless communication system 100, the wireless communication system 100 may include at least one BS and/or at least one UE.

Referring to FIG. 1, the BS 105 may include a transmission (Tx) data processor 115, a symbol modulator 120, a transmitter 125, a transceiving antenna 130, a processor 180, a memory 185, a receiver 190, a symbol demodulator 195 and a received data processor 197.

In addition, the UE 110 may include a Tx data processor 165, a symbol modulator 170, a transmitter 175, a transceiving antenna 135, a processor 155, a memory 160, a receiver 140, a symbol demodulator 155 and a received data processor 150. Although the BS/UE 105/110 includes one antenna 130/135 in the drawing, each of the BS 105 and the UE 110 includes a plurality of antennas. Therefore, each of the BS 105 and the UE 110 of the present disclosure supports a multiple input multiple output (MIMO) system. And, the BS 105 according to the present disclosure may support both single user-MIMO (SU-MIMO) and multi user-MIMO (MU-MIMO) systems.

In DL, the Tx data processor 115 receives traffic data, codes the received traffic data by formatting the received traffic data, interleaves the coded traffic data, modulates (or symbol maps) the interleaved data, and then provides modulated symbols (data symbols). The symbol modulator 120 provides a stream of symbols by receiving and processing the data symbols and pilot symbols.

The symbol modulator 120 multiplexes the data and pilot symbols together and then transmits the multiplexed symbols to the transmitter 125. In doing so, each of the transmitted symbols may include the data symbol, the pilot symbol or a signal value of zero. In each symbol duration, pilot symbols may be contiguously transmitted. In doing so, the pilot symbols may include symbols of frequency division multiplexing (FDM), orthogonal frequency division multiplexing (OFDM), or code division multiplexing (CDM).

The transmitter 125 receives the stream of the symbols, converts the received stream to at least one or more analog signals, additionally adjusts the analog signals (e.g., amplification, filtering, frequency upconverting), and then generates a downlink signal suitable for a transmission on a radio channel. Subsequently, the downlink signal is transmitted to the UE via the antenna 130.

In the configuration of the UE 110, the receiving antenna 135 receives the downlink signal from the BS and then provides the received signal to the receiver 140. The receiver 140 adjusts the received signal (e.g., filtering, amplification and frequency downconverting), digitizes the adjusted signal, and then obtains samples. The symbol demodulator 145 demodulates the received pilot symbols and then provides them to the processor 155 for channel estimation.

The symbol demodulator 145 receives a frequency response estimated value for downlink from the processor 155, performs data demodulation on the received data symbols, obtains data symbol estimated values (i.e., estimated values of the transmitted data symbols), and then provides the data symbols estimated values to the received (Rx) data processor 150. The received data processor 150 reconstructs the transmitted traffic data by performing demodulation (i.e., symbol demapping, deinterleaving and decoding) on the data symbol estimated values. The processing by the symbol demodulator 145 and the processing by the received data processor 150 are complementary to the processing by the symbol modulator 120 and the processing by the Tx data processor 115 in the BS 105, respectively.

In the UE 110 in UL, the Tx data processor 165 processes the traffic data and then provides data symbols. The symbol modulator 170 receives the data symbols, multiplexes the received data symbols, performs modulation on the multiplexed symbols, and then provides a stream of the symbols to the transmitter 175. The transmitter 175 receives the stream of the symbols, processes the received stream, and generates a UL signal. This UL signal is then transmitted to the BS 105 via the antenna 135.

In the BS 105, the UL signal is received from the UE 110 via the antenna 130. The receiver 190 processes the received UL signal and then obtains samples. Subsequently, the symbol demodulator 195 processes the samples and then provides pilot symbols received in UL and a data symbol estimated value. The received data processor 197 processes the data symbol estimated value and then reconstructs the traffic data transmitted from the UE 110.

The processor 155/180 of the UE/BS 110/105 directs operations (e.g., control, adjustment, management, etc.) of the UE/BS 110/105. The processor 155/180 may be connected to the memory unit 160/185 configured to store program codes and data. The memory 160/185 is connected to the processor 155/180 to store operating systems, applications and general files.

The processor 155/180 may be called one of a controller, a microcontroller, a microprocessor, a microcomputer and the like. And, the processor 155/180 may be implemented using hardware, firmware, software and/or any combinations thereof.

In the implementation by hardware, the processor 155/180 may be provided with such a device configured to implement the present disclosure as application specific integrated circuits (ASICs), digital signal processors (DSPs), digital signal processing devices (DSPDs), programmable logic devices (PLDs), field programmable gate arrays (FPGAs), and the like.

Meanwhile, in case of implementing the embodiments of the present disclosure using firmware or software, the firmware or software may be configured to include modules, procedures, and/or functions for performing the above-explained functions or operations of the present disclosure. And, the firmware or software configured to implement the present disclosure is loaded in the processor 155/180 or saved in the memory 160/185 to be driven by the processor 155/180.

Layers of a radio protocol between a UE/BS and a wireless communication system (network) may be classified into 1st layer L1, 2nd layer L2 and 3rd layer L3 based on 3 lower layers of open system interconnection (OSI) model well known to communication systems. A physical layer belongs to the 1st layer and provides an information transfer service via a physical channel. Radio resource control (RRC) layer belongs to the 3rd layer and provides control radio resourced between UE and network. A UE and a BS may be able to exchange RRC messages with each other through a wireless communication network and RRC layers.

In the present specification, although the processor 155/180 of the UE/BS performs an operation of processing signals and data except a function for the UE/BS 110/105 to receive or transmit a signal, for clarity, the processors 155 and 180 will not be mentioned in the following description specifically. In the following description, the processor 155/180 can be regarded as performing a series of operations such as a data processing and the like except a function of receiving or transmitting a signal without being specially mentioned.

For example, the UE 110 may be a drone. A drone may be a flying object capable of conducting communication. For example, the drone may have the same structure as the UE 110. Further, the drone may be a device communicating with other UEs, which should not be construed as limiting.

Figure 2:
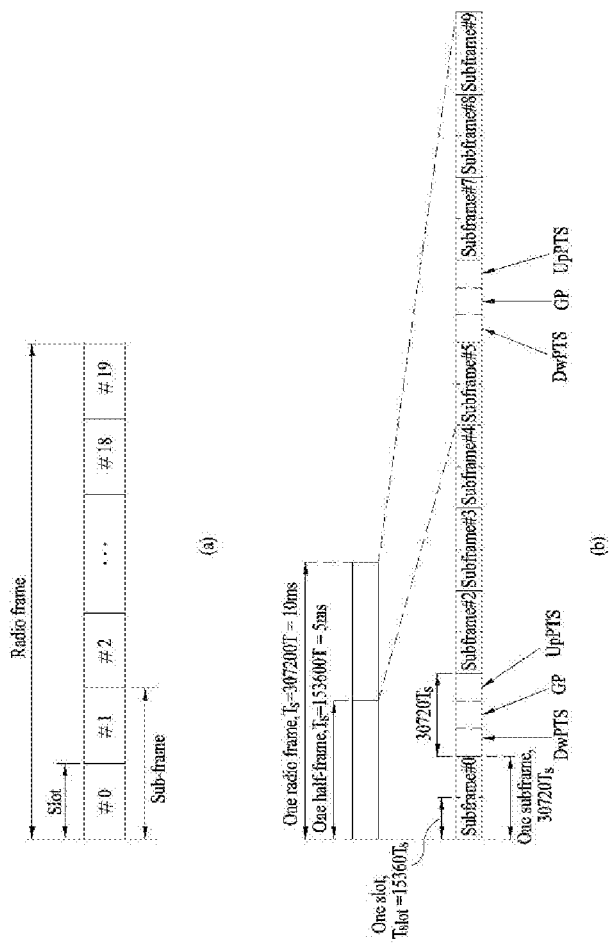
FIG. 2 illustrates the structure of a radio frame used in a wireless communication system.

FIG. 2 is a diagram for an example of a radio frame structure used in a wireless communication system. Specifically, FIG. 2 (a) illustrates an exemplary structure of a radio frame which can be used for frequency division duplex (FDD) in 3GPP LTE/LTE-A system and FIG. 2 (b) illustrates an exemplary structure of a radio frame which can be used for time division duplex (TDD) in 3GPP LTE/LTE-A system.

Referring to FIG. 2, a 3GPP LTE/LTE-A radio frame is 10 ms (307,200 Ts) in duration. The radio frame is divided into 10 subframes of equal size. Subframe numbers may be assigned to the 10 subframes within one radio frame, respectively. Here, Ts denotes sampling time where Ts=1/(2048*15 kHz). Each subframe is 1 ms long and is further divided into two slots. 20 slots are sequentially numbered from 0 to 19 in one radio frame. Duration of each slot is 0.5 ms. A time interval in which one subframe is transmitted is defined as a transmission time interval (TTI). Time resources may be distinguished by a radio frame number (or radio frame index), a subframe number (or subframe index), a slot number (or slot index), and the like.

A radio frame may have different configurations according to duplex modes. In FDD mode for example, since DL transmission and UL transmission are discriminated according to frequency, a radio frame for a specific frequency band operating on a carrier frequency includes either DL subframes or UL subframes. In TDD mode, since DL transmission and UL transmission are discriminated according to time, a radio frame for a specific frequency band operating on a carrier frequency includes both DL subframes and UL subframes.

Table 1 shows an exemplary UL-DL configuration within a radio frame in TDD mode.

TABLE 1

| DL-UL config-uration | Downlink-to-Uplink Switch-point periodicity | Subframe number | | | | | | | | | |
|---|---|---|---|---|---|---|---|---|---|---|---|
| | | 0 | 1 | 2 | 3 | 4 | 5 | 6 | 7 | 8 | 9 |
| 0 | 5 ms | D | S | U | U | U | D | S | U | U | U |
| 1 | 5 ms | D | S | U | U | D | D | S | U | U | D |
| 2 | 5 ms | D | S | U | D | D | D | S | U | D | D |
| 3 | 10 ms | D | S | U | U | U | D | D | D | D | D |
| 4 | 10 ms | D | S | U | U | D | D | D | D | D | D |
| 5 | 10 ms | D | S | U | D | D | D | D | D | D | D |
| 6 | 5 ms | D | S | U | U | U | D | S | U | U | D |

In Table 1, D denotes a DL subframe, U denotes a UL subframe, and S denotes a special subframe. The special subframe includes three fields, i.e. downlink pilot time slot (DwPTS), guard period (GP), and uplink pilot time slot (UpPTS). DwPTS is a time period reserved for DL transmission and UpPTS is a time period reserved for UL transmission. Table 2 shows an example of the special subframe configuration.

TABLE 2

| Special subframe configuration | Normal cyclic prefix in downlink | | | Extended cyclic prefix in downlink | | |
|---|---|---|---|---|---|---|
| | | UpPTS | | | UpPTS | |
| | DwPTS | Normal cyclic prefix in uplink | Extended cyclic prefix in uplink | DwPTS | Normal cyclic prefix in uplink | Extended cyclic prefix in uplink |
| 0 | $6592 \cdot T_s$ | $2192 \cdot T_s$ | $2560 \cdot T_s$ | $7680 \cdot T_s$ | $2192 \cdot T_s$ | $2560 \cdot T_s$ |
| 1 | $19760 \cdot T_s$ | | | $20480 \cdot T_s$ | | |
| 2 | $21952 \cdot T_s$ | | | $23040 \cdot T_s$ | | |
| 3 | $24144 \cdot T_s$ | | | $25600 \cdot T_s$ | | |
| 4 | $26336 \cdot T_s$ | | | $7680 \cdot T_s$ | | |
| 5 | $6592 \cdot T_s$ | $4384 \cdot T_s$ | $5120 \cdot T_s$ | $20480 \cdot T_s$ | $4384 \cdot T_s$ | $5120 \cdot T_s$ |
| 6 | $19760 \cdot T_s$ | | | $23040 \cdot T_s$ | | |
| 7 | $21952 \cdot T_s$ | | | $12800 \cdot T_s$ | | |
| 8 | $24144 \cdot T_s$ | | | — | — | — |
| 9 | $13168 \cdot T_s$ | | | — | — | — |

FIG. 2 illustrates the structure of a DL/UL slot structure in a wireless communication system. In particular, FIG. 2 illustrates the structure of a resource grid of a 3GPP LTE/LTE-A system. One resource grid is defined per antenna port.

Figure 3:
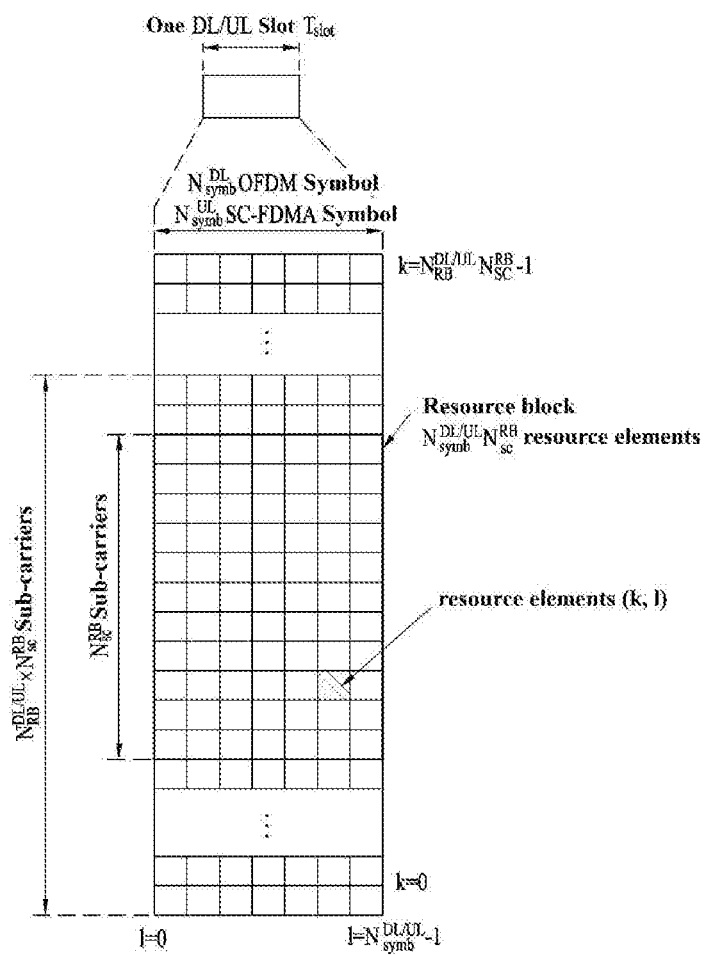
FIG. 3 illustrates the structure of a downlink/uplink (DL/UL) slot in a wireless communication system.

Referring to FIG. 3, a slot includes a plurality of orthogonal frequency division multiplexing (OFDM) symbols in the time domain and includes a plurality of resource blocks (RBs) in the frequency domain. The OFDM symbol may refer to one symbol duration. Referring to FIG. 3, a signal transmitted in each slot may be expressed by a resource grid including NDL/ULRB*NRBsc subcarriers and NDL/ULsymb OFDM symbols. NDLRB denotes the number of RBs in a DL slot and NULRB denotes the number of RBs in a UL slot. NDLRB and NULRB depend on a DL transmission bandwidth and a UL transmission bandwidth, respectively. NDLsymb denotes the number of OFDM symbols in a DL slot, NULsymb denotes the number of OFDM symbols in a UL slot, and NRBsc denotes the number of subcarriers configuring one RB.

An OFDM symbol may be referred to as an OFDM symbol, a single carrier frequency division multiplexing (SC-FDM) symbol, etc. according to multiple access schemes. The number of OFDM symbols included in one slot may be varied according to channel bandwidths and CP lengths. For example, in a normal cyclic prefix (CP) case, one slot includes 7 OFDM symbols. In an extended CP case, one slot includes 6 OFDM symbols. Although one slot of a subframe including 7 OFDM symbols is shown in FIG. 3 for convenience of description, embodiments of the present disclosure are similarly applicable to subframes having a different number of OFDM symbols. Referring to FIG. 3, each OFDM symbol includes NDL/ULRB*NRBsc subcarriers in the frequency domain. The type of the subcarrier may be divided into a data subcarrier for data transmission, a reference signal (RS) subcarrier for RS transmission, and a null subcarrier for a guard band and a DC component. The null subcarrier for the DC component is unused and is mapped to a carrier frequency f0 in a process of generating an OFDM signal or in a frequency up-conversion process. The carrier frequency is also called a center frequency.

One RB is defined as NDL/ULsymb (e.g. 7) consecutive OFDM symbols in the time domain and as NRBsc (e.g. 12) consecutive subcarriers in the frequency domain. For reference, a resource composed of one OFDM symbol and one subcarrier is referred to a resource element (RE) or tone. Accordingly, one RB includes NDL/ULsymb*NRBsc REs. Each RE within a resource grid may be uniquely defined by an index pair (k, l) within one slot. k is an index ranging from 0 to NDL/ULRB*NRBsc−1 in the frequency domain, and l is an index ranging from 0 to NDL/ULsymb−1 in the time domain.

In one subframe, two RBs each located in two slots of the subframe while occupying the same NRBsc consecutive subcarriers are referred to as a physical resource block (PRB) pair. Two RBs configuring a PRB pair have the same PRB number (or the same PRB index). A VRB corresponds to a logical resource allocation unit which is introduced to allocate a resource. The VRB has a size identical to a size of a PRB. The VRB is classified into a localized type VRB and a distributed type VRB according to a scheme of mapping the VRB to a PRB. Since VRBs of the localized type are directly mapped to PRBs, a VRB number (or VRB index) directly corresponds to a PRB number. In particular, it becomes nPRB=nVRB. Numbers ranging from 0 to NDL-PRB−1 are assigned to the VRBs of the localized type and NDLVRB=NDLRB. Hence, according to the localized mapping scheme, a VRB having the same VRB number is mapped to a PRB of the same PRB number in a first slot and a second slot. On the contrary, a VRB of the distributed type is mapped to a PRB by passing through interleaving. Hence, a VRB of the distributed type including the same VRB number can be mapped to PRBs of a different number in a first slot and a second slot. Two PRBs each of which is located at each slot of a subframe and having the same VRB number are referred to as a VRB pair.

Figure 4:
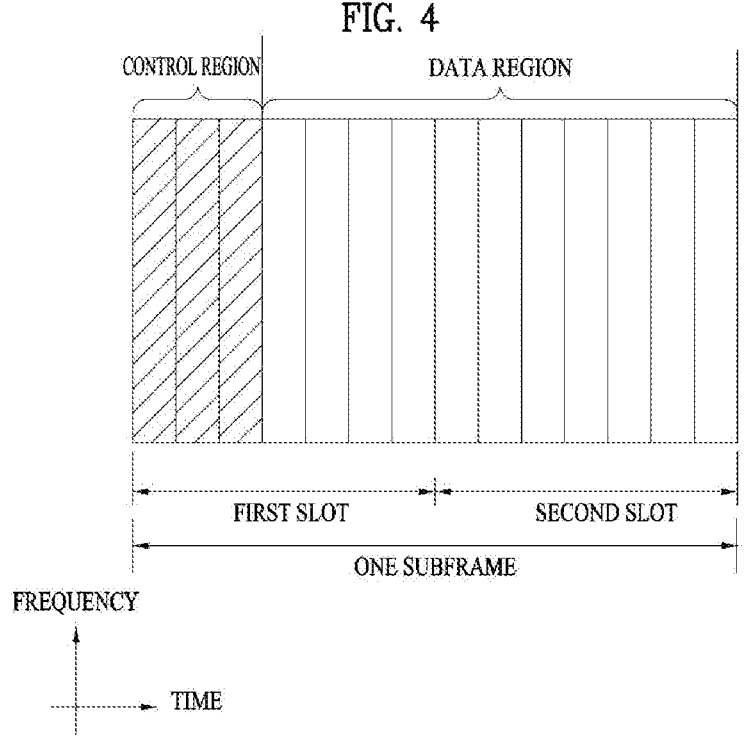
FIG. 4 illustrates the structure of a downlink (DL) subframe used in a $3^{rd}$ generation partnership project (3GPP) long term evolution/long term evolution-advanced (LTE/LTE-A) system.

FIG. 4 illustrates a structure of a DL subframe used in 3GPP LTE/LTE-A system.

Referring to FIG. 4, a DL subframe is divided into a control region and a data region in the time domain. Referring to FIG. 4, a maximum of 3 (or 4) OFDM symbols located in a front part of a first slot of a subframe corresponds to the control region. Hereinafter, a resource region for physical downlink control channel (PDCCH) transmission in a DL subframe is referred to as a PDCCH region. OFDM symbols other than the OFDM symbol(s) used in the control region correspond to the data region to which a physical downlink shared channel (PDSCH) is allocated. Hereinafter, a resource region available for PDSCH transmission in the DL subframe is referred to as a PDSCH region. Examples of a DL control channel used in 3GPP LTE include a physical control format indicator channel (PCFICH), a PDCCH, a physical hybrid ARQ indicator channel (PHICH), etc. The PCFICH is transmitted in the first OFDM symbol of a subframe and carries information about the number of OFDM symbols available for transmission of a control channel within a subframe. The PCFICH carries a hybrid automatic repeat request (HARQ) acknowledgment/negative-acknowledgment (ACK/NACK) signal in response to UL transmission.

Control information transmitted on a PDCCH is referred to as downlink control information (DCI). The DCI includes resource allocation information for a UE or UE group and other control information. For example, the DCI includes transmit format and resource allocation information of a downlink shared channel (DL-SCH), transmit format and resource allocation information of an uplink shared channel (UL-SCH), paging information of a paging channel (PCH), system information on a DL-SCH, resource allocation information of a upper layer control message such as a random access response transmitted on PDSCH, a transmit power control command for individual UEs belonging to a UE group, a transmit power control command, activation indication information of VoIP (Voice over IP), a DAI (downlink assignment index), and the like. Transmit format and resource allocation information of a downlink shared channel (DL-SCH) are referred to as DL scheduling information or DL grant. Transmit format and resource allocation information of an uplink shared channel (UL-SCH) are referred to as UL scheduling information or UL grant. The size and usage of the DCI carried by one PDCCH are varied depending on DCI formats. The size of the DCI may be varied depending on a coding rate. In the current 3GPP LTE system, various formats are defined, wherein formats 0 and 4 are defined for a UL, and formats 1, 1A, 1B, 1C, 1D, 2, 2A, 2B, 2C, 3 and 3A are defined for a DL. Combination selected from control information such as a hopping flag, RB allocation, modulation coding scheme (MCS), redundancy version (RV), new data indicator (NDI), transmit power control (TPC), cyclic shift demodulation reference signal (DM RS), UL index, channel quality information (CQI) request, DL assignment index, HARQ process number, transmitted precoding matrix indicator (TPMI), precoding matrix indicator (PMI) information is transmitted to the UE as the DCI.

In general, a DCI format capable of being transmitted to a UE varies depending on a transmission mode (TM) set to the UE. In other word, if a UE is configured by a specific transmission mode, it may be able to use a prescribed DCI format(s) corresponding to the specific transmission mode only rather than all DCI formats.

A PDCCH is formed by aggregating one or more consecutive control channel elements (CCEs). A CCE is a logical allocation unit used to provide a PDCCH at a coding rate based on the state of a radio channel. A CCE corresponds to a plurality of resource element groups (REGs). For example, one CCE corresponds to 9 REGs and one REG corresponds to 4 REs. 3GPP LTE defines a CCE set where PDCCH is able to be positioned for each of the UEs. The CCE set for which a UE is able to search its own PDCCH is called a PDCCH search space, simply a search space (SS). An individual resource to which PDCCH is able to be transmitted thereto within the SS is called a PDCCH candidate. A set of PDCCH candidates to be monitored by a UE is defined as a search space. In 3GPP LTE/LTE-A system, a search space for each DCI format may have a different size and a dedicated search space and a common search space are separately defined. The dedicated search space corresponds to a UE-specific search space and may be individually set for each of UEs. The common search space is configured for a plurality of UEs. Aggregation levels for defining the search space are shown in the following.

TABLE 3

| | Search Space $S_k^{(L)}$ | | |
|---|---|---|---|
| Type | Aggregation Level L | Size[in CCEs] | Number of PDCCH candidates $M^{(L)}$ |
| UE-specific | 1 | 6 | 6 |
| | 2 | 12 | 6 |
| | 4 | 8 | 2 |
| | 8 | 16 | 2 |
| Common | 4 | 16 | 4 |
| | 8 | 16 | 2 |

One PDCCH candidate corresponds to 1, 2, 4, or 8 CCEs according to a CCE aggregation level. An eNB transmits actual PDCCH (DCI) in a random PDCCH candidate belonging to a search space and a UE monitors the search space to find out PDCCH (DCI). In this case, the verb 'monitor' means that the UE attempts to decode each of the PDCCH candidates belonging to the search space in accordance with PDCCH formats monitored by the UE. The UE monitors a plurality of PDCCHs and may be able to detect PDCCH of the UE. Basically, since the UE is unable to know a position from which the PDCCH of the UE is transmitted, the UE attempts to decode all PDCCHs of a corresponding DCI format in every subframe until PDCCH including an identifier of the UE is detected. This process is referred to as blind detection (or blind decoding) (BD).

An eNB can transmit data for a UE or a UE group via a data region. The data transmitted via the data region is referred to as a user data. In order to transmit the user data, physical downlink shared channel (PDSCH) can be assigned to the data region. Paging channel (PCH) and downlink-shared channel (DL-SCH) are transmitted via the PDSCH. A UE decodes control information transmitted on the PDCCH to read the data transmitted via the PDSCH. Information indicating a UE or a UE group to which the data of the PDSCH is transmitted and information indicating a method for the UE or the UE group to receive and decode the PDSCH data are transmitted in a manner of being included in the PDCCH. For example, it is assumed that a specific PDCCH is CRC-masked with a radio network temporary identity (RNTI) "A", and information about data transmitted using a radio resource (e.g., frequency location) "B" and transmission format information (e.g., transmission block size, modulation scheme, coding information, or the like) "C" is transmitted via a specific DL subframe. In this case, a UE monitors a PDCCH using its own RNTI information, and if one or more UEs having "A" RNTI are present, the UEs receive the PDCCH and receive the PDSCH indicated by "B" and "C" through the information about the received PDCCH.

In order for a UE to demodulate a signal received from an eNB, it is necessary to have a reference signal (RS) to be compared with a data signal. The reference signal corresponds to a signal of a predetermined specific waveform transmitted to the UE by the eNB or to the eNB by the UE and is referred to as a pilot signal as well. Reference signals are classified into a cell-specific RS commonly used by all UEs in a cell and a demodulation RS (DM RS) dedicated to a specific UE. A DM RS transmitted by an eNB to demodulate downlink data of a specific UE is referred to as a UE-specific RS. In DL, it may transmit a DM RS and a cell-specific reference signal (CRS) together or transmit either the DM RS or the CRS only. In this case, if the DM RS is transmitted only in DL without the CRS, since the DM RS, which is transmitted by applying the same precoder with data, is used for demodulation purpose only, it is necessary to separately provide an RS for measuring a channel. For example, in 3GPP LTE(-A), an additional RS for measuring a channel, i.e., a channel state information-RS (CSI-RS), is transmitted to a UE to make the UE measure channel state information. Unlike a CRS transmitted in every subframe, the CSI-RS is transmitted with a prescribed transmission period consisting of a plurality of subframes based on a fact that a channel state is not considerably changed over time.

Figure 5:
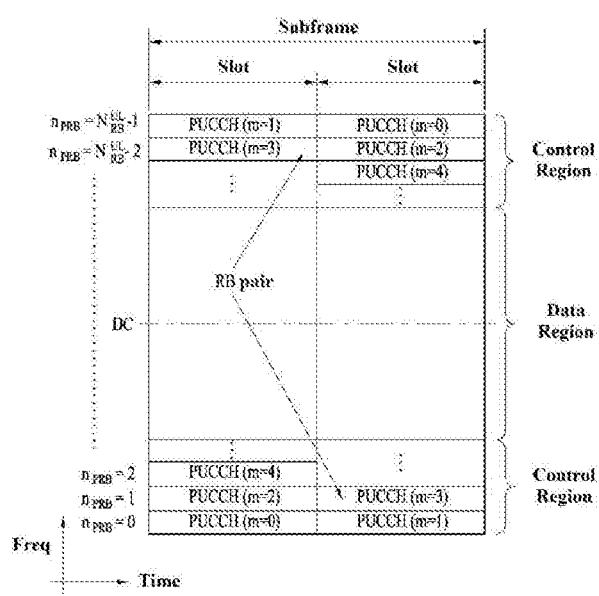
FIG. 5 illustrates the structure of an uplink (UL) subframe used in the 3GPP LTE/LTE-A system.

FIG. 5 is a diagram for an example of an uplink (UL) subframe structure used in 3GPP LTE/LTE-A system.

Referring to FIG. 5, an UL subframe can be divided into a control region and a data region in frequency domain. At least one physical uplink control channel (PUCCH) can be assigned to the control region to transmit uplink control information (hereinafter abbreviated UCI). At least one physical uplink shared channel (PUSCH) can be assigned to the data region to transmit user data.

In an UL subframe, subcarriers far from a direct current (DC) subcarrier are utilized as a control region. In other word, subcarriers positioned at both ends of an UL transmission bandwidth are assigned to transmit UCI. The DC subcarrier is a remaining component not used for transmitting a signal and mapped to a carrier frequency f0 in a frequency up converting process. PUCCH for one UE is assigned to an RB pair in one subframe. RBs belonging to the RB pair occupy a subcarrier different from each other in two slots, respectively. This sort of PUCCH can be represented in a manner that the RB pair allocated to the PUCCH is frequency hopped on a slot boundary. Yet, if a frequency hopping is not applied, the RB pair occupies an identical subcarrier.

PUCCH can be used for transmitting control information described in the following.
- Scheduling request (SR): Information used for requesting uplink UL-SCH resource. OOK (on-off keying) scheme is used to transmit the SR.
- HARQ ACK/NACK: Response signal for PDCCH and/or a DL data packet (e.g., codeword) on PDSCH. This information indicates whether or not PDCCH or PDSCH is successfully received. HARQ-ACK 1 bit is transmitted in response to a single DL codeword. HARQ-ACK 2 bits are transmitted in response to two DL codewords. HARQ-ACK response includes a positive ACK (simple, ACK), a negative ACK (hereinafter, NACK), DTX (discontinuous transmission), or NACK/DTX. In this case, the term HARQ-ACK is used in a manner of being mixed with HARQ ACK/NACK, ACK/NACK.
- Channel state information (CSI): Feedback information on a DL channel. MIMO-related feedback information includes a rank indicator (RI) and a precoding matrix indicator (PMI).

The amount of control information (UCI) capable of being transmitted by a UE in a subframe depends on the number of SC-FDMAs available for transmitting control information. The SC-FDMAs available for transmitting the control information correspond to the remaining SC-FDMA symbols except SC-FDMA symbols used for transmitting a reference signal in a subframe. In case of a subframe to which a sounding reference signal (SRS) is set, the last SC-FDMA symbol of the subframe is also excluded. A reference signal is used for coherent detection of PUCCH. PUCCH supports various formats depending on transmitted information.

Table 4 in the following shows a mapping relation between a PUCCH format and UCI in LTE/LTE-A system.

TABLE 4

| PUCCH format | Modulation scheme | Number of bits per subframe | Usage | Etc. |
| --- | --- | --- | --- | --- |
| 1 | N/A | N/A (exist or absent) | SR (Scheduling Request) | |
| 1a | BPSK | 1 | ACK/NACK or SR + ACK/NACK | One codeword |
| 1b | QPSK | 2 | ACK/NACK or SR + ACK/NACK | Two codeword |
| 2 | QPSK | 20 | CQI/PMI/RI | Joint coding ACK/NACK (extended CP) |
| 2a | QPSK + BPSK | 21 | CQI/PMI/RI + ACK/NACK | Normal CP only |
| 2b | QPSK + QPSK | 22 | CQI/PMI/RI + ACK/NACK | Normal CP only |
| 3 | QPSK | 48 | ACK/NACK or SR + ACK/NACK or CQI/PMI/RI + ACK/NACK | |

Referring to Table 4, PUCCH format 1 is mainly used for transmitting ACK/NACK and PUCCH format 2 is mainly used for transmitting CSI such as CQI/PMI/RI, and PUCCH format 3 is mainly used for transmitting ACK/NACK information.

In general, in order for a network to obtain location information of a UE, various methods are used in a cellular communication system. As a representative method, a UE receives positioning reference signal (PRS) transmission-related configuration information of a BS from a higher layer signal and measures PRSs transmitted by cells adjacent to the UE to calculate location-related information of the UE using a positioning scheme such as observed time difference of arrival (OTDOA) and forwards the calculated information to the network. Besides, an assisted global navigation satellite system (A-GNSS) positioning scheme, enhanced cell-ID (E-CID) techniques, uplink time difference of arrival (UTDOA), and the like exist. The abovementioned positioning schemes can be utilized for various location-based services (e.g., advertising, location tracking, emergency communication means, etc.).

[LTE Positioning Protocol]

In LTE system, LTE positioning protocol (LPP) is defined to support the OTDOA scheme. According to the LPP, OTDOA-ProvideAssistanceData having a configuration described in the following is transmitted to a UE as an information element (IE).

TABLE 5

-- ASN1START
OTDOA-ProvideAssistanceData ::= SEQUENCE {
 otdoa-ReferenceCellInfo    OTDOA-ReferenceCellInfo
  OPTIONAL, -- Need ON
 otdoa-NeighbourCellInfo    OTDOA-NeighbourCellInfoList
  OPTIONAL, -- Need ON TABLE 5-continued otdoa-Error
     OTDOA-Error
  OPTIONAL,
 -- Need ON
 ...
}
-- ASN1STOP In this case, OTDOA-ReferenceCellInfo corresponds to a reference cell for measuring RSTD and can be configured as follows.

TABLE 6

-- ASN1START
OTDOA-ReferenceCellInfo ::= SEQUENCE {
 physCellId         INTEGER (0..503),
 cellGlobalId        ECGI
  OPTIONAL,         -- Need ON
 earfcnRef         ARFCN-ValueEUTRA
  OPTIONAL,         -- Cond NotSameAsServ0
 antennaPortConfig     ENUMERATED {ports1-or-2, ports4, ... }
  OPTIONAL,         -- Cond NotSameAsServ1
 cpLength          ENUMERATED { normal, extended, ... },
 prsInfo          PRS-Info
  OPTIONAL,         -- Cond PRS...,
 [{ earfcnRef-v9a0     ARFCN-ValueEUTRA-v9a0
  OPTIONAL         -- Cond NotSameAsServ2}]
 }
-- ASN1STOP In this case, conditional presences are shown in the following.

TABLE 7

| Conditional presence | description |
| --- | --- |
| NotSameAsServ0 | This field is absent if earfcnRef-v9a0 is present. Otherwise, the field is mandatory present if the EARFCN of the OTDOA assistance data reference cell is not the same as the EARFCN of the target devices's current primary cell. |
| NotSameAsServ1 | The field is mandatory present if the antenna port configuration of the OTDOA assistance data reference cell is not the same as the antenna port configuration of the target devices's current primary cell. |
| NotSameAsServ2 | The field is absent if earfcnRef is present. Otherwise, the field is mandatory present if the EARFCN of the OTDOA assistance data reference cell is not the same as the EARFCN of the target devices's current primary cell. |
| PRS | The field is mandatory present if positioning reference signals are available in the assistance data reference cell; otherwise it is not present. |

Each individual field of the OTDOA-ReferenceCellInfo is described in the following.

TABLE 8

OTDOA-ReferenceCellInfo field description
physCellId
This field specifies the physical cell identity of the assistance data reference cell.
cellGlobalId
This field specifies the ECGI, the globally unique identity of a cell in E-UTRA, of the assistance data reference cell. The server should include this field if it considers that it is needed to resolve ambiguity in the cell indicated by physCellId.
earfcnRef TABLE 8-continued This field specifies the EARFCN of the assistance data reference cell.
antennaPortConfig
This field specifies whether 1 (or 2) antenna port(s) or 4 antenna ports for cell specific reference signals (CRS) are used in the assistance data reference cell.
cpLength
This field specifies the cyclic prefix length of the assistance data reference cell PRS if the prsInfo field is present, otherwise this field specifies the cyclic prefix length of the assistance data reference cell CRS.
prsInfo
This field specifies the PRS configuration of the assistance data reference cell.

Meanwhile, OTDOA-NeighbourCellInfo corresponds to cells (e.g., an eNB or a TP) becoming a target of RSTD measurement and can include information on maximum 24 neighbor cells according to each frequency layer for maximum 3 frequency layers. In particular, it may be able to inform a UE of information on 72 (3*24) cells in total.

TABLE 9

```
-- ASN1START
    OTDOA-NeighbourCellInfoList ::= SEQUENCE (SIZE (1..maxFreqLayers)) OF
OTDOA-NeighbourFreqInfo
    OTDOA-NeighbourFreqInfo ::= SEQUENCE (SIZE (1..24)) OF OTDOA-
NeighbourCellInfoElement
    OTDOA-NeighbourCellInfoElement ::= SEQUENCE {
    physCellId                              INTEGER
        (0..503),
        cellGlobalId                        ECGI
    OPTIONAL,             -- Need ON
        earfcn                              ARFCN-
    alueEUTRA      OPTIONAL, --Cond NotSameAsRef0
        cpLength                            ENUMERATED
{normal, extended, ...}
        OPTIONAL,         -- Cond NotSameAsRef1
    prsInfo                                 PRS-Info
        OPTIONAL,         -- Cond NotSameAsRef2
        antennaPortConfig                   ENUMERATED {ports-
1-or-2, ports-4, ...}
        OPTIONAL,         -- Cond NotsameAsRef3
        slotNumberOffset                    INTEGER (0..19)
        OPTIONAL,         -- Cond NotSameAsRef4
    prs-SubframeOffset                      INTEGER (0..1279),
        OPTIONAL,         -- Cond InterFreq
        expectedRSTD                        INTEGER (0..16383),
        expectedRSTD-Uncertainty   INTEGER (0..1023),
        ...,
        [[ earfcn-v9a0                      ARFCN-ValueEUTRA-v9a0
        OPTIONAL          -- Cond NotSameAsRef5]]
    }
    maxFreqLayers  INTEGER ::= 3
-- ASN1STOP
```

In this case, conditional presences are shown in the following.

TABLE 10

| Conditional presence | Description |
| --- | --- |
| NotSame AsRef0 | The field is absent if earfcn-v9a0 is present. If earfcn-v9a0 is not present, the field is mandatory present if the EARFCN is not the same as for the assistance data reference cell; otherwise it is not present. |
| NotSame AsRef1 | The field is mandatory present if the cyclic prefix length is not the same as for the assistance data reference cell; otherwise it is not present. |
| NotSame AsRef2 | The field is mandatory present if the PRS configuration is not the same as for the assistance data reference cell; otherwise it is not present. |
| NotSame | The field is mandatory present if the antenna port |

TABLE 10-continued

| Conditional presence | Description |
| --- | --- |
| AsRef3 | configuration is not the same as for the assistance data reference cell; otherwise it is not present. |
| NotSame AsRef4 | The field is mandatory present if the slot timing is not the same as for the assistance data reference cell; otherwise it is not present. |
| NotSame AsRef5 | The field is absent if earfcn is present. If earfcn is not present, the field is mandatory present if the EARFCN is not the same as for the assistance data reference cell; otherwise it is not present. |
| InterFreq | The field is optionally present, need OP, if the EARFCN is not the same as for the assistance data reference cell; otherwise it is not present. |

Each individual field of the OTDOA-NeighbourCellInfoList is described in the following.

TABLE 11

OTDOA-NeighbourCellInfoList field description
physCellId
This field specifies the physical cell identity of the assistance data reference cell.
cellGlobalId
This field specifies the ECGI, the globally unique identity of a cell in E-UTRA, of the assistance data reference cell. The server should include this field if it considers that it is needed to resolve ambiguity in the cell indicated by physCellId.
earfcnRef
This field specifies the EARFCN of the assistance data reference cell.
antennaPortConfig
This field specifies whether 1 (or 2) antenna port(s) or 4 antenna ports for cell specific reference signals (CRS) are used in the assistance data reference cell.
cpLength
This field specifies the cyclic prefix length of the neigbour cell PRS if TABLE 11-continued PRS are present in this neighbour cell, otherwise this field specifies
the cyclic prefix length of CRS in this neighbour cell.
prsInfo
This field specifies the PRS configuration of the neighbour cell.
When the EARFCN of the neighbour cell is the same as for the
assistance data reference cell, the target device may assume that each
PRS positioning occasion in the neighbour cell at least partially overlaps
with a PRS positioning occasion in the assistance data reference cell
where the maximum offset between the transmitted PRS positioning
occasions may be assumed to not exceed half a subframe.
When the EARFCN of the neighbour cell is the same as for the assistance
data reference cell, the target device may assume that this cell has the
same PRS periodicity (Tprs) as the assistance data reference cell.

In this case, PRS-Info corresponding to an IE, which is included in the OTDOA-ReferenceCellInfo and the OTDOA-NeighbourCellInfo, includes PRS information. Specifically, the PRS-Info is configured as follows while including PRS Bandwidth, PRS Configuration Index (IPRS), Number of Consecutive Downlink Subframes, and PRS Muting Information.

TABLE 12

```
PRS-Info ::= SEQUENCE {
        prs-Bandwidth           ENUMERATED { n6, n15, n25, n50, n75,
n100, ... },
        prs-ConfigurationIndex  INTEGER (0..4095),
        numDL-Frames               ENUMERATED (sf-1, sf-2, sf-4, sf-6, ...},
        ...,
        prs-MutingInfo-r9       CHOICE {
                po2-r9                  BIT STRING (SIZE(2)),
                po4-r9                  BIT STRING (SIZE(4)),
                po8-r9                  BIT STRING (SIZE(8)),
                po16-r9                 BIT STRING
(SIZE(16)),
                ...
        }
        OPTIONAL                -- Need OP
}
-- ASN1STOP
```

Figure 6:
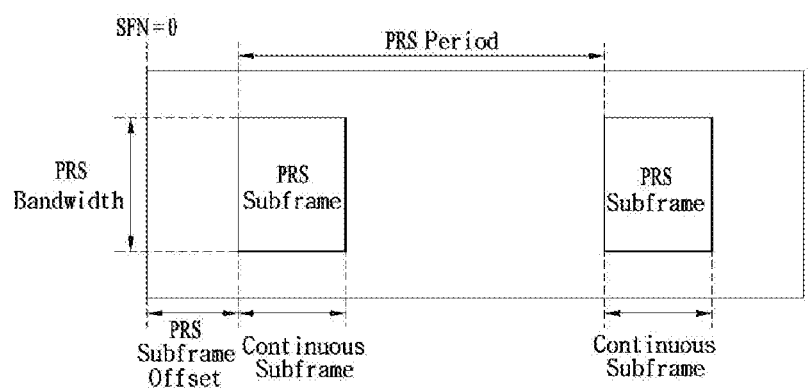
FIG. 6 illustrates a structure for transmitting a positioning reference signal (PRS).

FIG. 6 is a diagram for a PRS transmission structure according to the parameters.

In this case, PRS periodicity and PRS subframe offset are determined according to a value of PRS configuration index (IPRS) and a corresponding relation is shown in the following table.

TABLE 13

| PRS Configuration Index ($I_{PRS}$) | PRS Periodicity (subframes) | PRS Subframe Offset (subframes) |
|---|---|---|
| 0-159 | 160 | $I_{PRS}$ |
| 160-479 | 320 | $I_{PRS}$-160 |
| 480-1119 | 640 | $I_{PRS}$-480 |
| 1120-23399 | 1280 | $I_{PRS}$-1120 |

[PRS (Positioning Reference Signal)]

A PRS has a transmission occasion, that is, a positioning occasion at intervals of 160, 320, 640, or 1280 ms. The PRS may be transmitted in N consecutive DL subframes at the positioning occasion, where N may be 1, 2, 4, or 6. Although the PRS may be substantially transmitted at the positioning occasion, it may be muted for inter-cell interference control cooperation. Information on PRS muting is signaled to a UE through prs-MutingInfo. Unlike a system bandwidth of a serving BS, a PRB transmission bandwidth may be independently configured and the PRS is transmitted in a frequency bandwidth of 6, 15, 25, 50, 75, or 100 resource blocks (RBs). A transmission sequence for the PRS is generated by initializing a pseudo-random sequence generator for every OFDM symbol using a function of a slot index, an OFDM symbol index, a CP type, and a cell ID. The generated transmission sequences for the PRS can be differently mapped to REs based on whether a normal CP or extended CP is used. A position of the mapped RE may be shifted on the frequency axis, and in this case, a shift value is determined by a cell ID.

For PRS measurement, a UE receives configuration information on a list of PRSs that the UE should search for from a positioning server of the network. The corresponding information includes PRS configuration information of a reference cell and PRS configuration information of neighboring cells. Configuration information for each PRS includes a generation period of the positioning occasion and offset thereof, the number of consecutive DL subframes included in one positioning occasion, a cell ID used in generating a PRS sequence, a CP type, the number of CRS antenna ports considered in PRS mapping, etc. In addition, the PRS configuration information of neighboring cells includes slot offsets and subframe offsets of the neighbor cells and reference cell, expected RSTD, and a degree of uncertainty of the expected RSTD. Thus, the PRS configuration information of neighboring cells supports the UE to determine when and which time window the UE should search for corresponding PRSs to detect PRSs transmitted from the neighboring cells.

For example, FIG. 7 is a diagram illustrating mapping of a PRS to REs. A transmission sequence for the PRS is generated by initializing a pseudo-random sequence generator for every OFDM symbol using a function of a slot index, an OFDM symbol index, a CP type, and a physical cell ID. When a normal CP is used, the generated sequences can be mapped as shown in FIG. 7(a). When an extended CP is sued, the generated sequences can be mapped as shown in FIG. 7(b). A position of the mapped RE may be shifted on the frequency axis, and a shift value is determined by the physical cell ID. In this case, for example, the positions of REs for PRS transmission shown in FIGS. 7 (a) and (b) may be calculated on the assumption that the frequency shift is 0.

Meanwhile, the aforementioned RSTD may mean a relative timing difference between adjacent or neighboring cell j and reference cell i. That is, the RSTD can be expressed as TsubframeRxj−TsubframeRxi, where TsubframeRxj indicates a time when the UE receives the start of a specific subframe from the adjacent cell j, and TsubframeRxi indicates a time when the UE receives the start of a subframe corresponding to the specific subframe from the reference cell i, which is closest in time to the specific subframe received from the adjacent cell j. The reference point for the observed subframe time difference could be an antenna connector of the UE.

As described before, a network may use various methods to obtain location information about a UE in a wireless communication system. Other positioning schemes are also available, such as A-GNSS positioning, enhanced cell ID (E-CID), and uplink time difference of arrival (UTDOA). These positioning schemes may be used for a variety of location-based services (LBSs).

The existing positioning schemes are supported by the 3GPP UTRA and E-UTRA standards (e.g., LTE Rel-9), as described above. However, a more accurate advanced positioning scheme has recently been required for in-building positioning. For example, A-GNSS requires a GNSS receiver, which may be disadvantageous in terms of cost, complexity, and battery consumption. Moreover, A-GNSS has limitations in its effectiveness for in-building positioning. In contrast, techniques such as E-CID, OTDOA, and UTDOA are applicable commonly to both outdoor and indoor environments. Despite this benefit, they have errors in positioning accuracy, which brings the need for a method of increasing positioning accuracy.

For example, E-CID may have an accuracy of 150 m in a non-line of sight (NLOS) environment and an accuracy of 50 m in a line of sight (LOS) environment. PRS-based OTDOA also has eNB synchronization errors and multipath propagation-incurred errors. In OTDOA, the location of a UE may be estimated by measuring reference signal time differences (RSTDs) between a reference cell and multiple neighbor cells. Because the positioning error may exceed 100m due to an RSTD measurement quantization error and a timing offset estimation error in UE measurements, OTDOA may be limited in its utilization. For example, when a UE receives a weak PRS from a BS, RSTD errors increase. Accordingly, the strengths of PRSs received from a plurality of eNBs for RSTD measurement need to be great in order to increase positioning accuracy.

Further, for example, it is necessary to consider the accuracy of a vertical position, height as well as the accuracy of a horizontal position in positioning. However, most BSs are located at almost the same height, and thus OTDOA-based positioning using PRSs transmitted, by the BSs gives rise to a more serious error in the vertical direction than in the horizontal direction.

A description will be given below of an OTDOA-based positioning method using drones floating at various heights. Specifically, a drone may transmit a drone-PRS to a UE so that the UE may measure an RSTD with better performance than an RSTD from a BS. Therefore, the UE may be positioned more accurately. The drone may have already registered to the network.

Figure 8:
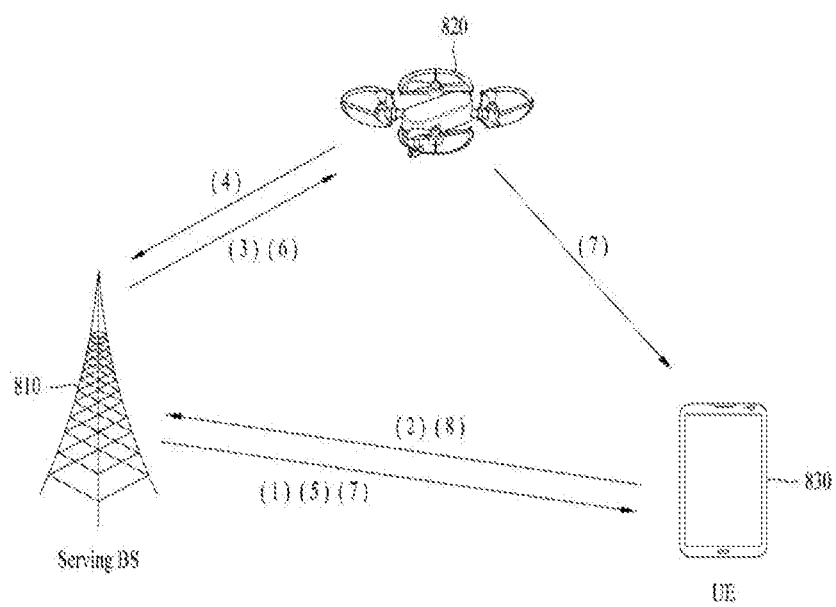
FIG. 8 is a diagram illustrating a method of positioning a UE by using a drone.

Referring to FIG. 8, OTDOA-based positioning may be performed by using a drone. A drone may be an unmanned aerial vehicle capable of conducting communication. For example, the drone may be a UE capable of securing wider LOS than a legacy UE. That is, the drone may be a device communicating with other UEs like a legacy UE, but have better LOS than the legacy UE. While such a UE is referred to as a done in relation to a device operation, any UE capable of securing LOS may correspond to a drone, which should not be construed as limiting. Further, such a device may be referred to as a name other than drone, which should not be construed as limiting.

The drone may be used, when a user is missing and should be tracked down outside the coverage of a BS or in a sea or mountain in which a signal is weak. That is, the drone may be used to conduct communication in an area which is not covered by the BS. For example, the drone may be a flying object which may fly to an out-coverage place or a sea or mountain with a weak signal, such as a disaster area. Further, as the drone may be a flying object, the drone may secure LOS.

Therefore, drone-based positioning may offer improved accuracy, compared to existing positioning schemes.

A description will be given of an OTDOA-based positioning method using a drone.

For example, referring to FIG. 8, a BS 810 may request information for D-PRS configuration to a UE 830 in "step (1)". The BS 810 may request the LTE 830 to report the strengths (e.g., reference signal received powers (RSRPs)) of signals obtained by measuring CSI-RSs, CRSS, and PRSs of signals received from reference cells for which RSTDs are to be measured, and signal strengths obtained by measuring SRSs received from specific drones (e.g., drones connected to the BS).

The UE 830 may report the information requested in "step (1)" to the BS 810 in "step (2)". Herein, the BS 810 may determine the RSTD accuracies of UEs 830 based on values reported by the UEs 830. That is, the BS 810 may determine a neighbor cell which has a PRS with a small reception strength and thus decreases the RSTD accuracies of the UEs 830 during RSTD measurement.

The BS 810 may use a PRS pattern of a drone instead of a PRS pattern of the neighbor cell with the small PRS reception strength. Further, the BS 810 may request D-PRS transmission to a drone providing a large SRS reception strength to multiple UEs 830 based on the SRS reception strengths of drones measured by the UEs 830.

Subsequently, the BS 810 may request a drone 820 to transmit a D-PRS in "step (3)". The BS 810 may request the drone 820 to transmit capability information for D-PRS transmission (e.g., a current location including a height, a speed, and so on) as well as the D-PRS. The capability information that the BS 810 requests to the drone 820 may basically include information indicating whether the drone 820 has resources available for PRS transmission, information about a frequency band available for D-PRS transmission, the maximum transmission power of the drone 820, and information indicating whether the drone 820 is equipped with a barometer sensor. Further, for example, the BS 810 may request current location information based on a height to the drone 820. If the drone 820 transmits the D-PRS at a height greatly different from the height of the BS 810, the accuracy of height estimation of the UE 830 may be increased. Therefore, the drone 820 may measure its location and height by using a GNSS or a barometer sensor and transmit information about the location and height to the BS 810.

Subsequently, the drone 820 may report information for D-PRS configuration to the BS 810 in "step (4)". The drone 820 may transmit the information requested by the BS 810 to the BS 810 in "step (3)". The BS 810 may configure a D-PRS for the drone 820 based on the value. The BS 810 may then transmit changed neighbor cell configuration information to the UE 830 in "step (5)". The BS 810 may transmit information about the D-PRS configured in "step (4)". The UE 830 may measure an RSTD based on the information received from the BS 810. However, when there is no change in an existing PRS configuration for RSTD measurement, the BS 810 may not need to transmit D-PRS information to the UE 830. For example, when a PRS from one of neighbor cells for which the UE 830 has been supposed to measure PRSs has been configured to match the D-PRS, the UE 830 does not need to change the information for RSTD measurement. The BS 810 may report to a location server that an RSTD value measured by the UE 830 after the drone 820 starts to transmit the D-PRS is from the D-PRS of the drone 820. Thus, the location server may perform only correction, when the UE 830 is positioned.

Subsequently, the BS 810 may transmit the D-PRS configuration information to the drone 820 in "step (6)". The BS 810 may transmit the D-PRS configuration information to the drone 820 before the drone 820 transmits the D-PRS. This information may include information about a D-PRS transmission timing as well as information like an existing PRS configuration. The D-PRS configuration information may include a cell ID based on which the drone 820 is to generate a sequence of the D-PRS, information about a D-PRS resource region, and information about the location of the BS 810 required for the drone 820 to synchronize the D-PRS transmission timing. The drone 820 may transmit the D-PRS according to the D-PRS configuration set by this information. The drone 820 may transmit the D-PRS until receiving a command indicating discontinuation of the D-PRS transmission in a physical-layer control signal from the BS 810. Further, for example, the drone 820 may preset a D-PRS transmission period.

The BS 810 and the drone 820 may then transmit the PRS and the D-PRS to the UE 830, respectively in "step (7)". For example, the BS 810 and the drone 820 may transmit the PRS and the D-PRS in synchronization. A method of acquiring synchronization will be described later.

The UE 830 may then measure an RSTD and report the measured RSTD to the BS 810 in "step (8)". The UE 830 may then report the measured RSTD to a network end as is done conventionally so that the network end may position the UE 830, which should not be construed as limiting.

Figure 9:
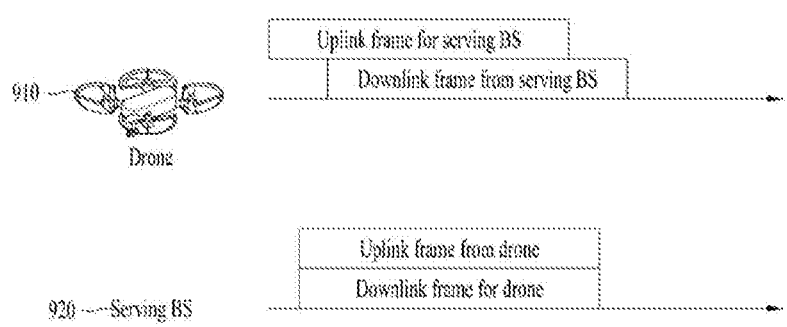
FIG. 9 is a diagram illustrating a method of synchronizing transmission timings between a drone and a serving cell.

FIG. 9 is a diagram illustrating a method of synchronizing transmission timings between a drone and a serving cell.

As described before, when a UE measures an RSTD through a BS and a drone and reports the RSTD, there may be a need for a method of increasing RSTD accuracy by reducing interference from PRSs and D-PRSs of multiple BSs and drones. For this purpose, the D-PRS of the drone may have to be transmitted at the same timing as the PRS of the BS. The D-PRS is transmitted to the UE on a UL of the drone, and the transmission timing of a UL signal from the drone is synchronized with the reception timings of UL signals from the drone and UEs at a serving BS, based on a timing advance (TA).

For example, FIG. 9 may illustrate the transmission timings and reception timings of a UL frame and a DL frame at a drone 910 and a BS 920. The BS 920 may synchronize the transmission timings of a DL frame transmitted to UEs including the drone 910 with the reception timings of UL frames received from the UEs including the drone 910. The drone 910 and the UEs may set their UL transmission timings through a TA so that UL signals transmitted by the drone 910 and the UEs may arrive in synchronization with the UL reception timings, based on the synchronized timing.

However, since the drone 910 transmits the D-PRS at a UL transmission timing which is not synchronized with the PRS of the BS 920, the UE may not measure an accurate RSTD. Therefore, the D-PRS transmission timing of the drone 910 should be corrected such that the PRS transmission timing of the BS 920 may be synchronized with the D-PRS transmission timing of the drone 910.

Figure 10:
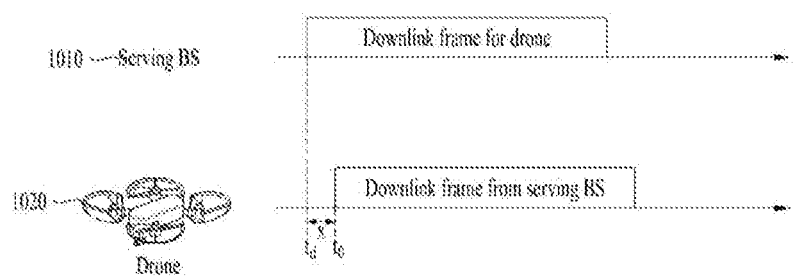
FIG. 10 is a diagram illustrating a method of correcting transmission timings between a drone and a serving cell.

More specifically, referring to FIG. 10, a drone 1020 may correct a D-PRS transmission timing with respect to a DL reception timing from a BS 1010. A D-PRS transmitted by the drone 1020 should be synchronized with a DL transmission timing of the BS 1010. Therefore, the drone 1020 may calculate td=t0−(d/c) by using a distance d between the BS 1010 and the drone 1020 which may be known from a reception time t0 of a DL signal from the BS 1010 and information about the BS 1010 received from the BS 1010. The drone 1020 may transmit the D-PRS based on the calculated time td. That is, the drone 1020 may transmit the D-PRS in consideration of the transmission timing of the PRS from the BS 1010.

Figure 11:
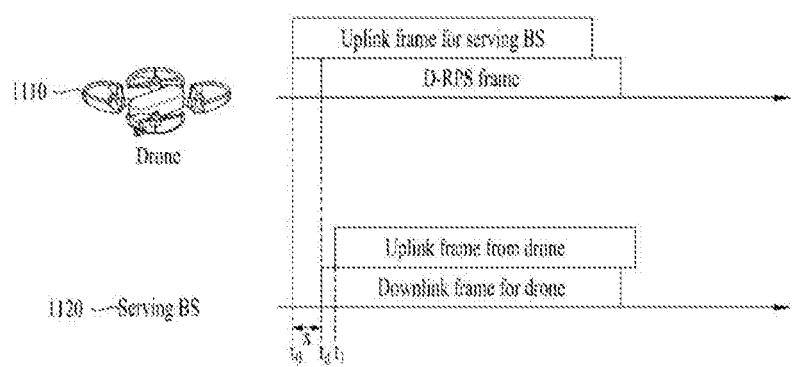
FIG. 11 is a diagram illustrating a method of correcting transmission timings of a drone and a serving cell.

In another example, referring to FIG. 11, a drone 1110 may correct a D-PRS transmission timing with respect to a UL transmission timing synchronized with a BS 1120. A UL signal transmitted at time t0 from the drone 1110 may arrive at the BS 1120 at time t1.

For example, time t1 may have to be perfectly synchronized with the DL transmission time td of the BS 1120. However, because the drone 1110 continuously moves and a TA resolution limit occurs during initial setting of the UL transmission timing of the drone 1110 based on a TA, t1 and td may not be perfectly synchronized. Therefore, it is necessary to utilize the location of the drone 1110 to set the D-PRS transmission timing of the drone 1110 more accurately. As the location of the drone 1110 is known, the BS 1120 may determine a time at which the drone 1110 transmits a UL signal by t0=t1−(d/c) based on time t1 at which the UL signal of the drone 1110 arrives and the distance d between the BS 1120 and the drone 1110.

Therefore, the BS 1120 may calculate the difference x between the DL time td of the BS 1120 at which the drone 1110 is to transmit the D-PRS and the UL time of the drone 1110 by Equation 1.

$$x=td-t0=td-(t1-(d/c))=td-t1+(d/c) \quad \text{[Equation 1]}$$

The BS 1120 may quantize the value of x and transmit the quantized value of x to the drone 1110. The drone 1110 may shift the transmission timing of a UL signal from the drone 1110 by x and transmit the D-PRS at the shifted time.

Further, for example, when the drone 1110 has moved for a specific distance or more, the PRS and the D-PRS become asynchronous, thereby decreasing the positioning accuracy. Accordingly, the D-PRS transmission timing needs to be reset. When the drone 1110 has moved for a specific distance or more, the process of setting a D-PRS transmission timing may be performed again. In another example, the D-PRS may be generated and transmitted by using a synchronized D-PRS transmission timing.

Figure 12:
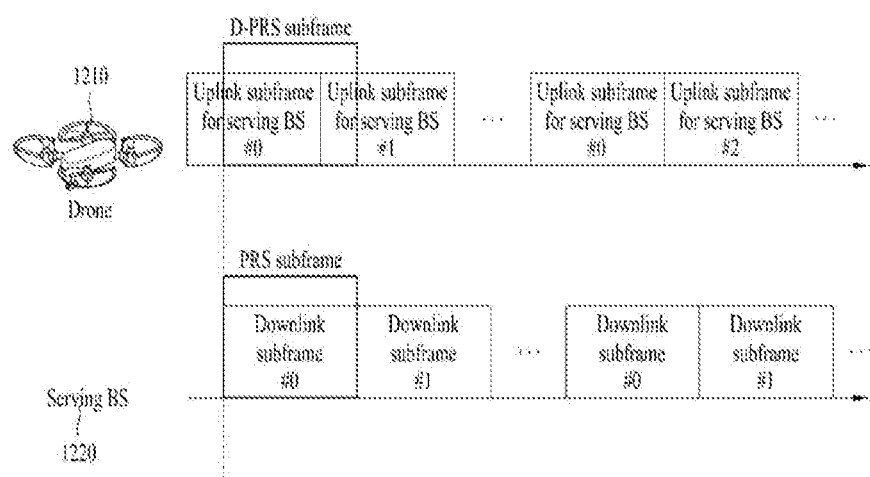
FIG. 12 is a diagram illustrating a method of correcting transmission timings of a drone and a serving cell.

For example, referring to FIG. 12, a UL transmission timing may not be changed, and a drone 1210 may generate and transmit a D-PRS in corresponding OFDM symbols at a D-PRS transmission timing. Therefore, as illustrated in FIG. 12, when the drone 1210 transmits the D-PRS in one subframe, the drone 1210 may generate and transmit the D-PRS over two UL subframes, which should not be construed as limiting.

Figure 13:
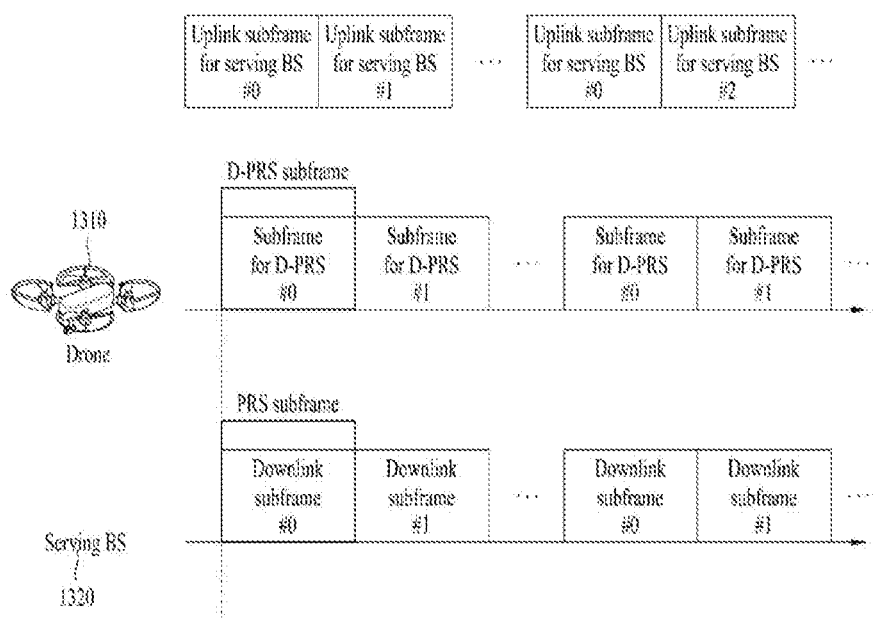
FIG. 13 is a diagram illustrating a method of correcting transmission timings of a drone and a serving cell.

In another example, referring to FIG. 13, a drone 1310 may change a frame starting time such that a frame starts when a drone 1310 transmits a D-PRS and when the drone 1310 transmit data on a UL to a BS 1320. When the drone 1310 transmits the D-PRS in one subframe and transmits two UL subframes, the drone 1310 may generate and transmit the D-PRS over two UL subframes, which should not be construed as limiting.

That is, after the drone 1310 gets prior knowledge of the transmission timing of a UL frame for data transmission to the BS 1320 and the transmission timing of a UL frame for D-PRS transmission, the drone 1310 may select a transmission timing according to a transmitted UL frame.

For example, based on the above description, there may be a need for a blank area in which no signal is transmitted between data transmission and D-PRS transmission, in order to synchronize the transmission timings with each other. However, for example, in the presence of a blank area, the D-PRS may not be generated across a plurality of subframes as illustrated in FIG. 12, and instead, the blank area may be used.

As described above, a UE may receive a synchronized PRS and D-PRS. A serving BS may obtain data transmitted by a drone by receiving a UL signal in a state where UL signals from the drone and the UE are synchronized with each other.

Figure 14:
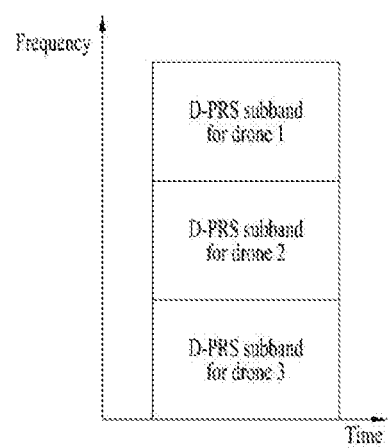
FIG. 14 is a diagram illustrating a method of transmitting drone-positioning reference signals (D-PRSs) in subbands.

In another example, referring to FIG. 14, a plurality of drones may transmit D-PRSs. For example, the D-PRSs may be generated using different cell IDs. However, when a plurality of drones generate D-PRSs, PRSs may be generated and transmitted with different cell IDs by using a plurality of cell IDs corresponding to small PRS reception strengths at the UE. A drone may generate and transmit a D-PRS by using a frequency band in which a PRS corresponding to a specific cell ID corresponding to a largest reception strength has been transmitted.

In another example, D-PRSs may be transmitted by allocating different PRB resource regions. For example, the D-PRSs may be transmitted in subbands (subband D-PRS transmission).

A resource region in which a drone transmits a D-PRS may be a part of an existing PRS resource region for a UE. The drone may generate a D-PRS with a predetermined cell ID across a total band like a PRS that the UE has received, and then transmit the D-PRS only in an allocated specific subband. That is, a plurality of drones may generate the same D-PRS with the same cell ID and then transmit the D-PRS in different allocated frequency resources.

For example, referring to FIG. 14, three drones may generate and transmit D-PRSs with the same cell ID. Each drone may be allocated a different subband and transmit a D-PRS in the allocated subband. Therefore, the difficulty in transmitting a D-PRS across a total band due to the limited power of the drone may be overcome. Further, a plurality of drones may generate D-PRSs with the same cell ID and transmit the D-PRSs at the same time.

Figure 15:
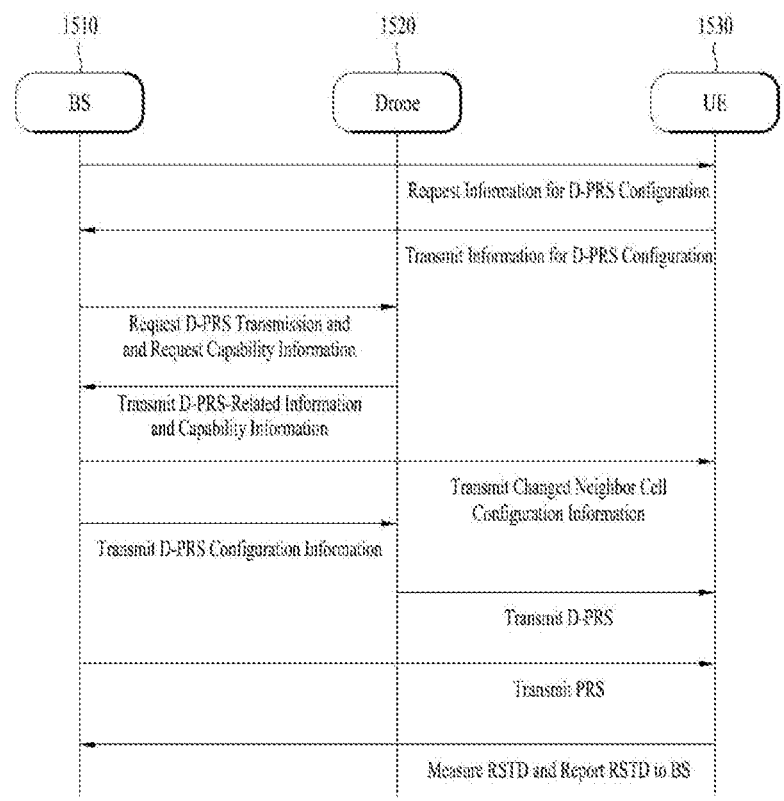
FIG. 15 is a diagram illustrating a signal flow for a method of positioning a UE, performed by a drone.

FIG. 15 is a diagram illustrating a signal flow for a positioning method using a drone at a UE.

Referring to FIG. 15, a BS 1510 may request information for D-PRS configuration to a UE 1530. The requesting for information for D-PRS configuration may correspond to the afore-described "step (1)". The BS 1510 may request information about neighbor cells and drones to the UE 1530.

Subsequently, the UE 1530 may transmit the information for D-PRS configuration to the BS 1510. The transmission of the information for D-PRS configuration may correspond to the afore-described "step (2)". That is, the UE 1530 may transmit the requested information to the BS 1510 in this step.

The BS 1510 may then request a drone 1520 to transmit a D-PRS. Further, the BS 1510 may request capability information for D-PRS transmission to the drone 1520. This step may correspond to the afore-described "step (3)". That is, the BS 1510 may request the related information as well as the D-PRS transmission to the drone 1520.

Subsequently, the drone 1520 may transmit D-PRS-related information and capability information to the BS 1510. That is, the drone 1520 may transmit the related information to the BS 1510 based on the afore-described information request. This step may correspond to the afore-described "step (4)".

The BS 1510 may then transmit changed neighbor cell information to the UE 1530. This step may correspond to the afore-described "step (5)". As described before, in the absence of any change in a PRS configuration, the BS 1510 may not transmit the information to the UE.

Subsequently, the BS 1510 may transmit D-PRS configuration information to the drone 1520. The transmission of D-PRS configuration information to the drone 1520 may correspond to the afore-described "step (6)". Before the drone 1520 transmits a D-PRS, the BS 1510 may transmit the D-PRS configuration information to the drone 1520.

The BS 1510 may then transmit a PRS to the UE 1530, and the drone 1520 may transmit the D-PRS to the UE 1530. This may correspond to the afore-described "step (7)". That is, the BS 1510 and the drone 1520 may transmit the PRS and the D-PRS respectively to the UE 1530. For example, the BS 1510 and the drone 1520 may transmit the PRS and the D-PRS in synchronization with each other, as described before.

The UE 1530 may then measure an RSTD and report the measured RSTD to the BS 1510. This may correspond to the afore-described "step (8)". The BS 1510 may estimate the location of the UE 1530 based on the RSTD.

FIG. 16 is a flowchart illustrating a positioning method using a drone at a UE.

A UE may transmit information for D-PRS configuration to a BS (S1610). As described before with reference to FIGS. 1 to 15, upon request from the BS, the UE may transmit the information for D-PRS configuration to the BS. The information transmitted by the UE may be about neighbor cells and drones, as described before.

The UE may then receive D-PRS configuration information from the BS (S1620). As described before with reference to FIGS. 1 to 15, when a PRS configuration has been changed or when needed, the UE may receive D-PRS configuration information from the BS. Subsequently, the UE may receive a PRS from the BS and a D-PRS from a drone. As described before with reference to FIGS. 1 to 15, the PRS transmitted by the BS and the D-PRS transmitted by the drone may be synchronized with each other. Further, for example, the UE may receive D-PRSs from a plurality of drones. For example, the plurality of drones may have different cell IDs. In another example, the plurality of drones may have the same cell ID. The UE may allocate a subband to each of the plurality of drones and receive D-PRSs in the subbands from the drones, as described before.

Then, the UE may obtain information related to the location of the UE based on the PRS and the D-PRS (S1640). As described before with reference to FIGS. 1 to 15, the UE may measure an RSTD through the PRS and the D-PRS. For example, the location-related information may be the RSTD. The UE may then transmit the location-related information to the BS (S1650). As described before with reference to FIGS. 1 to 15, the UE may transmit information about the afore-described RSTD to the BS, and the BS may share this information with another BS.

The embodiments of the present disclosure mentioned in the foregoing description can be implemented using various means. For instance, the embodiments of the present disclosure can be implemented using hardware, firmware, software and/or any combinations thereof.

When implemented as hardware, a method according to embodiments of the present disclosure may be embodied as one or more application specific integrated circuits (ASICs), one or more digital signal processors (DSPs), one or more digital signal processing devices (DSPDs), one or more programmable logic devices (PLDs), one or more field programmable gate arrays (FPGAs), a processor, a controller, a microcontroller, a microprocessor, etc.

When implemented as firmware or software, a method according to embodiments of the present disclosure may be embodied as a module, a procedure, or a function that performs the functions or operations described above. Software code may be stored in a memory unit and executed by a processor. The memory unit is located at the interior or exterior of the processor and may transmit and receive data to and from the processor via various known means.

Preferred embodiments of the present disclosure have been described in detail above to allow those skilled in the art to implement and practice the present disclosure. Although the preferred embodiments of the present disclosure have been described above, those skilled in the art will appreciate that various modifications and variations can be made in the present disclosure without departing from the spirit or scope of the disclosure. For example, those skilled in the art may use a combination of elements set forth in the above-described embodiments. Thus, the present disclosure is not intended to be limited to the embodiments described herein, but is intended to accord with the widest scope corresponding to the principles and novel features disclosed herein. The present disclosure may be carried out in other specific ways than those set forth herein without departing from the spirit and essential characteristics of the present disclosure. Therefore, the above embodiments should be construed in all aspects as illustrative and not restrictive. The scope of the disclosure should be determined by the appended claims and their legal equivalents, and all changes coming within the meaning and equivalency range of the appended claims are intended to be embraced therein. The present disclosure is not intended to be limited to the embodiments described herein, but is intended to accord with the widest scope consistent with the principles and novel features disclosed herein. In addition, claims that are not explicitly cited in each other in the appended claims may be presented in combination as an embodiment of the present disclosure or included as a new claim by subsequent amendment after the application is filed.

In addition, both an apparatus invention and a method invention are explained in the present specification, and if necessary, the explanation on both the disclosures can be complementally applied.

The invention claimed is:

1. A method of performing positioning using a drone by a user equipment (UE) in a wireless communication system, the method comprising:
   transmitting information for receiving a drone positioning reference signal (D-PRS) configuration to a base station (BS);
   receiving the D-PRS configuration information from the BS, based on the information transmitted by the UE, wherein the D-PRS configuration is based on information required for synchronization of a transmission timing of a D-PRS with a transmission timing of a PRS that is exchanged between the BS and the drone;
   receiving a positioning reference signal (PRS) from the BS and receiving a D-PRS from a drone, wherein the PRS and D-PRS are synchronized with each other, according to the synchronized transmission timing;
   obtaining location-related information about the UE based on the PRS and the D-PRS; and
   transmitting the location-related information to the BS.

2. The method according to claim 1, wherein based on the UE receiving a request for transmission of the information for the D-PRS configuration from the BS, the UE transmits the information for D-PRS configuration to the BS.

3. The method according to claim 1, wherein after the BS exchanges information related to the D-PRS with the drone, including the information required for synchronization of the transmission timing of a D-PRS with the transmission timing of a PRS, the UE receives the D-PRS configuration information from the BS.

4. The method according to claim 3, wherein the BS and the drone synchronize a transmission timing of the PRS with a transmission timing of the D-PRS based on the information related to the D-PRS.

5. The method according to claim 1, wherein the UE receives a D-PRS from each of a plurality of drones having different cell identifiers (IDs).

6. The method according to claim 1, wherein the UE receives a D-PRS from each of a plurality of drones having the same cell ID.

7. The method according to claim 6, wherein different subbands are allocated to each of the plurality of drones, and the UE receives the D-PRS from each of the plurality of drones in the corresponding allocated subband.

8. The method according to claim 1, wherein based on the drone moving a distance equal to or larger than a threshold, the UE receives the D-PRS configuration information again from the BS.

9. A user equipment (UE) for performing positioning using a drone in a wireless communication system, the UE comprising:
   a receiver configured to receive a signal;
   a transmitter configured to transmit a signal; and
   a processor configured to control the receiver and the transmitter,
   wherein the processor is further configured to:
      control the transmitter to transmit information for receiving a drone positioning reference signal (D-PRS) configuration to a base station (BS),
      control the receiver to receive the D-PRS configuration information from the BS, based on the transmitted information, wherein the D-PRS configuration is based on information required for synchronization of a transmission timing of a D-PRS with a transmission timing of a PRS,
      control the receiver to receive a positioning reference signal (PRS) from the BS and receive a D-PRS from the drone, wherein the PRS and D-PRS are synchronized with each other, according to the synchronized transmission timing,
      obtain location-related information about the UE based on the PRS and the D-PRS, and
      control the transmitter to transmit the location-related information to the BS.

10. The UE according to claim 9, wherein based on the processor receiving a request for transmission of the information for the D-PRS configuration from the BS, the processor is further configured to control the transmitter to transmit the information for D-PRS configuration to the BS.

11. The UE according to claim 9, wherein after the BS exchanges information related to the D-PRS with the drone, including the information required for synchronization of the transmission timing of a D-PRS with the transmission timing of a PRS, the processor is further configured to control the receiver to receive the D-PRS configuration information from the BS.

12. The UE according to claim 11, wherein the BS and the drone synchronize a transmission timing of the PRS with a transmission timing of the D-PRS based on the information related to the D-PRS.

13. The UE according to claim 9, wherein the processor is further configured to control the receiver to receive a D-PRS from each of a plurality of drones having different cell identifiers (IDs).

14. The UE according to claim 9, wherein the processor is further configured to control the receiver to receive a D-PRS from each of a plurality of drones having the same cell ID.

15. The UE according to claim 14, wherein different subbands are allocated to each of the plurality of drones, and the processor is further configured to control the receiver to receive the D-PRS from each of the plurality of drones in the corresponding allocated subband.

16. The UE according to claim 9, wherein the UE is capable of communicating with at least one of another UE, a UE related to an autonomous driving vehicle, a base station or a network.

\* \* \* \* \*